United States Patent
Ashley

(10) Patent No.: US 9,444,829 B1
(45) Date of Patent: Sep. 13, 2016

(54) SYSTEMS AND METHODS FOR PROTECTING COMPUTING RESOURCES BASED ON LOGICAL DATA MODELS

(71) Applicant: Symantec Corporation, Mountain View, CA (US)

(72) Inventor: Peter Ashley, Hopkinton, MA (US)

(73) Assignee: Symantec Corporation, Mountain View, CA (US)

( * ) Notice: Subject to any disclaimer, the term of this patent is extended or adjusted under 35 U.S.C. 154(b) by 35 days.

(21) Appl. No.: 14/447,026

(22) Filed: Jul. 30, 2014

(51) Int. Cl.
H04L 29/06 (2006.01)
G06F 21/55 (2013.01)
G06F 17/30 (2006.01)
H04L 12/26 (2006.01)

(52) U.S. Cl.
CPC ....... H04L 63/1416 (2013.01); H04L 63/1408 (2013.01); G06F 17/30864 (2013.01); G06F 21/552 (2013.01); H04L 43/045 (2013.01); H04L 43/06 (2013.01); H04L 43/106 (2013.01); H04L 43/16 (2013.01); H04L 63/0218 (2013.01); H04L 63/0227 (2013.01); H04L 63/0263 (2013.01); H04L 63/145 (2013.01); H04L 63/1441 (2013.01)

(58) Field of Classification Search
CPC .......... H04L 63/0227; H04L 63/1416; H04L 63/145; H04L 43/045; H04L 43/06; H04L 43/106; H04L 43/16; H04L 63/20; H04L 63/0263; H04L 63/1441; H04L 63/0218; G06F 21/552; G06F 17/30864
See application file for complete search history.

(56) References Cited

U.S. PATENT DOCUMENTS

| | | | | |
|---|---|---|---|---|
| 8,087,087 B1* | 12/2011 | van Oorschot | ....... | H04L 63/102 726/1 |
| 2003/0084349 A1* | 5/2003 | Friedrichs | ............... | G06F 21/55 726/22 |
| 2005/0060562 A1* | 3/2005 | Bhattacharya | ...... | H04L 63/1416 726/26 |
| 2012/0144187 A1* | 6/2012 | Wei | ..................... | H04L 63/0281 713/152 |
| 2014/0282871 A1* | 9/2014 | Rowland | .................. | H04L 63/20 726/3 |
| 2015/0163198 A1* | 6/2015 | Moore | .................. | H04L 63/029 726/14 |
| 2015/0244732 A1* | 8/2015 | Golshan | ............. | H04L 63/1416 726/24 |
| 2015/0281260 A1* | 10/2015 | Arcamone | .......... | H04L 63/1408 726/11 |
| 2015/0310217 A1* | 10/2015 | Artes | .................... | G06F 21/577 726/25 |

* cited by examiner

Primary Examiner — Mohammad A Siddiqi
(74) Attorney, Agent, or Firm — ALG Intellectual Property, LLC

(57) ABSTRACT

A computer-implemented method for protecting computing resources based on logical data models may include (1) receiving, from a security agent, log data that specifies details of a security event detected by the security agent, (2) creating an instance of a data structure for a logical data model that describes a path cycle of a security threat, (3) populating at least one field of the data structure for the logical data model with a completed value, (4) populating at least one other field of the data structure for the logical data model with a value of incomplete based on a completed value for the other field being unavailable, and (5) performing a security action based on an analysis of the instance of the data structure for the logical data model. Various other methods, systems, and computer-readable media are also disclosed.

20 Claims, 7 Drawing Sheets

SYSTEMS AND METHODS FOR PROTECTING COMPUTING RESOURCES BASED ON LOGICAL DATA MODELS

BACKGROUND

Individuals and organizations generally seek to protect their computing resources using antivirus and security products. Some solutions may involve installing a security agent on an endpoint computing device. The security agent may then record and collect information about events at the endpoint computing device, including security events like network intrusions. Subsequently, the security agent may also provide the recorded data, in the form of log data, to a backend server.

Unfortunately, the reported log data may suffer from several deficiencies. For example, the log data may include redundancies without normalizing the data, as in a normalized database. Similarly, the log data may be incomplete such that the log data reports some recorded data without reporting related metadata. Even if a logical data model would suggest the existence of other metadata, based on the existence of underlying log data, the log data may not even include fields for that metadata. Accordingly, the log data does not enable security vendors to perform meaningful statistics based on that metadata. Moreover, security employees may manually perform all of the following operations: (1) identifying different security threats, (2) organizing information about them, and (3) targeting resources based on analyzing that information.

Accordingly, the instant disclosure identifies and addresses a need for additional and improved systems and methods for protecting computing resources based on logical data models.

SUMMARY

As will be described in greater detail below, the instant disclosure generally relates to systems and methods for protecting computing resources based on logical data models by, for example, automatically populating fields of a data structure for the logical data model based on incomplete underlying log data. In one example, a computer-implemented method for protecting computing resources based on logical data models may include (1) receiving, from a security agent, log data that specifies details of a security event detected by the security agent, (2) creating an instance of a data structure for a logical data model that describes a path cycle of a security threat, the data structure including fields that specify at least an origin and a target of the security threat, (3) populating one field of the data structure for the logical data model based on the details specified by the received log data, (4) populating one other field of the data structure for the logical data model with a value of incomplete based on a completed value for the other field being unavailable, and (5) performing a security action to protect users based on an analysis of the instance of the data structure for the logical data model.

In one embodiment, creating the instance of the data structure may include inferring the existence of security metadata based on underlying security data detected by the security agent. The underlying security data may correspond to the field of the data structure populated based on the details specified by the received log data. Similarly, the security metadata may correspond to the other field populated with the value of incomplete.

In some examples, populating the other field with the value of incomplete may be performed based on inferring the existence of the security metadata. The underlying security data may describe the security event detected by the security agent. In some examples, inferring the existence of security metadata may be performed according to a rules database of rules for inferring security metadata from underlying security data.

In one embodiment, the security metadata corresponds to the security threat and describes (1) an attacker that initiates the security threat, (2) an attack vector that the security threat exploits to propagate itself, (3) a threat payload, and/or (4) a transmission mechanism for transmitting the payload. In some examples, creating the instance of the data structure may include categorizing the security event as belonging to a category of use cases from among a set of use cases that describe types of security events. Creating the instance may also include basing the creating of the instance of the data structure on the categorization of the security event as belonging to the use case.

In one embodiment, the use case may correspond to one of: (1) a malware bot command and control server event, (2) a network intrusion detection system event, and (3) a port scan event. In some examples, performing the security action to protect users may include creating an additional instance of the data structure based on the instance of the data structure for the logical data model.

In one embodiment, performing the security action may include inferring the existence of an additional security event based on the security event detected by the security agent. The security event may correspond to the instance of the data structure for the logical data model. Similarly, the additional security event may correspond to the additional instance of the data structure for the logical data model.

In some examples, populating the other field of the data structure for the logical data model with the value of incomplete may include determining whether the completed value is available for the other field. Populating the other field may also include populating the other field of the data structure with the value of incomplete based on determining that the completed value for the other field is unavailable.

In some examples, performing the security action may include ascertaining the completed value for the other field of the data structure for the logical data model. Performing the security action may also include overwriting the value of incomplete for the other field with the completed value.

In some examples, ascertaining the completed value for the other field of the data structure for the logical data model may include extracting the completed value from a cloud computing system. In further examples, performing the security action may include determining that the other field is populated with the value of incomplete. Performing the security action may also include targeting investigation resources to determine the completed value for the other field based on the determination that the other field is populated with the value of incomplete.

In one embodiment, a system for implementing the above-described method may include (1) a reception module, stored in memory, that receives, from a security agent, log data that specifies details of a security event detected by the security agent, (2) a creation module, stored in memory, that creates an instance of a data structure for a logical data model that describes a path cycle of a security threat, the data structure including fields that specify at least an origin and a target of the security threat, (3) a populating module, stored in memory, that: (A) populates one field of the data structure for the logical data model based on the details specified by the received log data and (B) populates one other field of the data structure for the logical data model with a value of incomplete based on a completed value for the other field being unavailable, (4) a performance module, stored in memory, that performs a security action to protect users based on an analysis of the instance of the data structure for the logical data model, and (5) at least one physical processor configured to execute the reception module, the creation module, the populating module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, from a security agent, log data that specifies details of a security event detected by the security agent, (2) create an instance of a data structure for a logical data model that describes a path cycle of a security threat, the data structure including fields that specify at least an origin and a target of the security threat, (3) populate one field of the data structure for the logical data model based on the details specified by the received log data, (4) populate one other field of the data structure for the logical data model with a value of incomplete based on a completed value for the other field being unavailable, and (5) perform a security action to protect users based on an analysis of the instance of the data structure for the logical data model.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
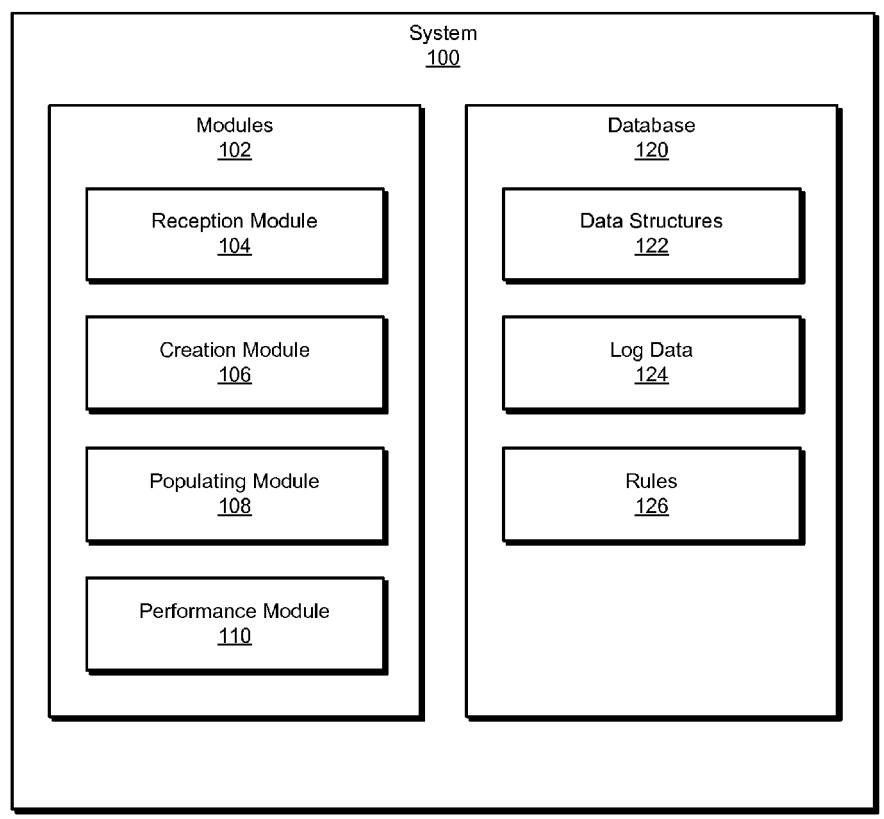
FIG. 1 is a block diagram of an exemplary system for protecting computing resources based on logical data models.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for protecting computing resources based on logical data models. As will be explained in greater detail below, the disclosed systems and methods may normalize log data received from security agents. The disclosed systems and methods may also automatically prepare data structures for logical data models, even when values for some fields of the data structures are currently unavailable. Accordingly, the disclosed systems and methods may enable security vendors to automatically prepare and analyze these data structures to thereby establish a more accurate and comprehensive view of security threats and appropriate responses.

Figure 2:
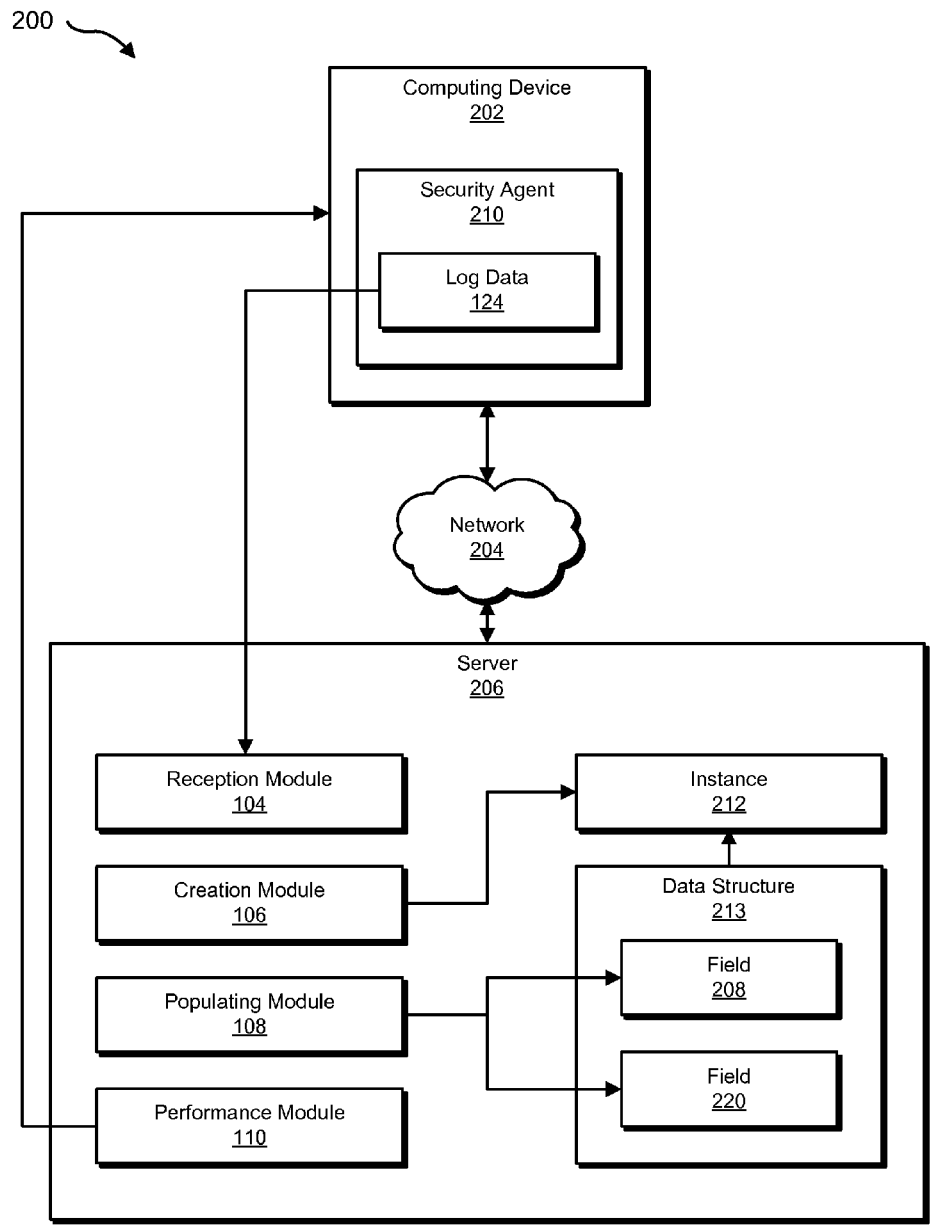
FIG. 2 is a block diagram of an additional exemplary system for protecting computing resources based on logical data models.

The following will provide, with reference to FIGS. 1-2, detailed descriptions of exemplary systems for protecting computing resources based on logical data models. Detailed descriptions of corresponding computer-implemented methods will also be provided in connection with FIG. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for protecting computing resources based on logical data models. As illustrated in this figure, exemplary system 100 may include one or more modules 102 for performing one or more tasks. For example, and as will be explained in greater detail below, exemplary system 100 may also include a reception module 104 that may receive, from a security agent, log data that specifies details of a security event detected by the security agent. Exemplary system 100 may additionally include a creation module 106 that may create an instance of a data structure for a logical data model that describes a path cycle of a security threat. The data structure may include fields that specify at least an origin and a target of the security threat.

Exemplary system 100 may also include a populating module 108 that may populate one field of the data structure for the logical data model based on the details specified by the received log data. Populating module 108 may also populate one other field of the data structure for the logical data model with a value of incomplete based on a completed value for the other field being unavailable.

Exemplary system 100 may additionally include a performance module 110 that may perform a security action to protect users based on an analysis of the instance of the data structure for the logical data model. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store data structures 122, which may describe a path cycle of a security threat and may be based on logical data models. Database 120 may also be configured to store log data 124, which may correspond to log data reported by security agents on endpoint computing systems, as discussed above. As a last example, database 120 may also be configured to store rules 126, which may define relationships between different fields of data structures 122, instances of data structures, use case categorizations, and/or security actions, as discussed further below.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to protect computing resources based on logical data models. For example, and as will be described in greater detail below, reception module 104 may receive, from a security agent 210, log data 124 that specifies details of a security event detected by security agent 210. Creation module 106 may create an instance 212 of a data structure 213 for a logical data model that describes a path cycle of a security threat. Data structure 213 may include fields that specify at least an origin and a target of the security threat. Populating module 108 may populate one field 208 of data structure 213 for the logical data model based on the details specified by the received log data 124. Populating module 108 may also populate one other field 220 of data structure 213 for the logical data model with a value of incomplete based on a completed value for other field 220 being unavailable. Lastly, performance module 110 may perform a security action to protect users, such as users at computing device 202, based on an analysis of instance 212 of data structure 213 for the logical data model.

In the example of FIG. 2, computing device 202 may generally represent an endpoint computing system protected by security agent 210 that reports telemetry data to server 206. In contrast, server 206 may generally represent a backend server for a security vendor that collects, organizes, and analyzes telemetry data. In response, server 206 may also perform security actions to protect users. In other examples, any permutation of modules 102 may be spread across one or both of computing device 202 and server 206.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of creating and/or analyzing data structures that describe security threats. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
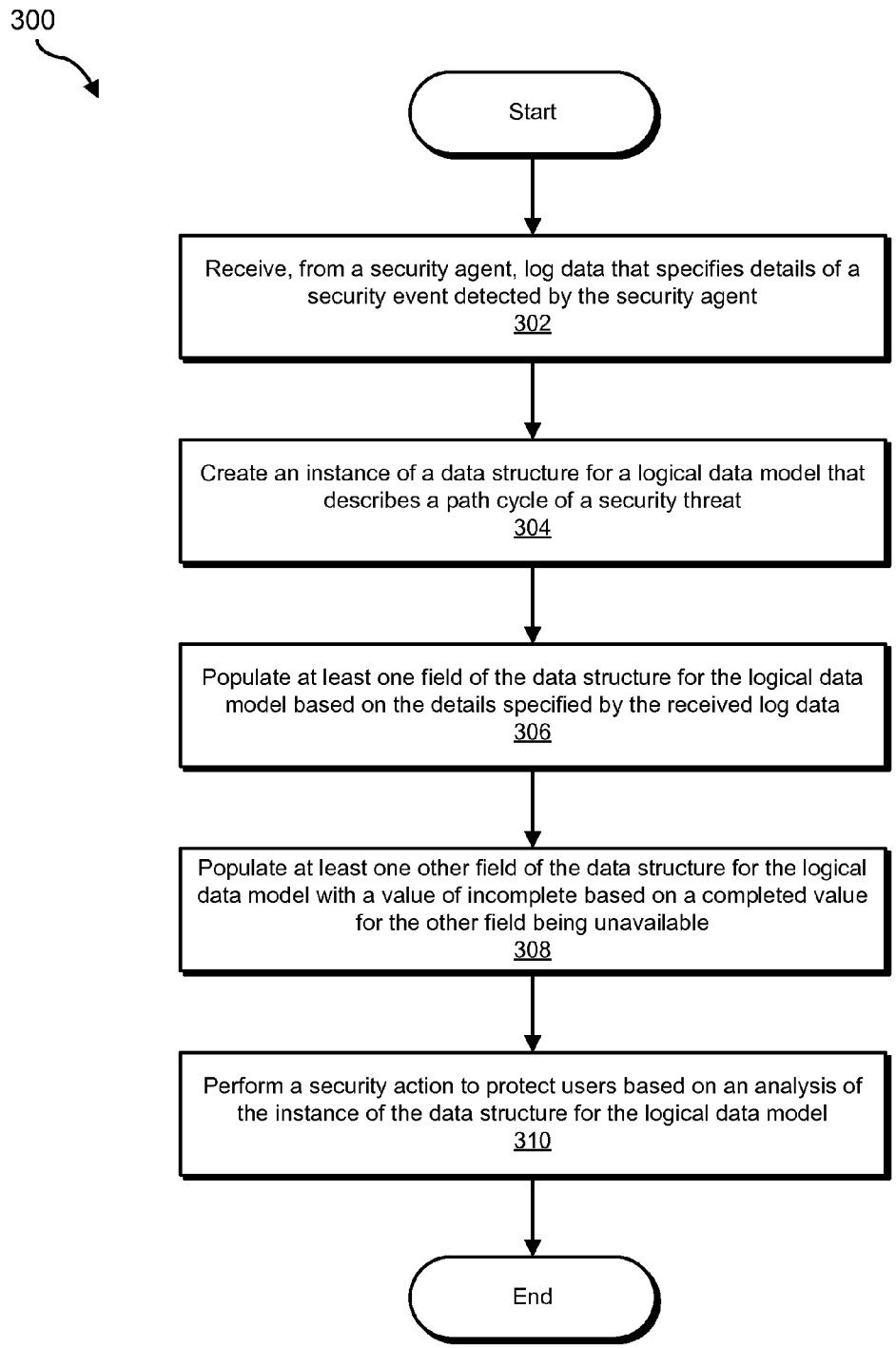
FIG. 3 is a flow diagram of an exemplary method for protecting computing resources based on logical data models.

FIG. 3 is a flow diagram of an exemplary computer-implemented method 300 for protecting computing resources based on logical data models. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may receive, from a security agent, log data that specifies details of a security event detected by the security agent. For example, at step 302 reception module 104 may, as part of server 206 in FIG. 2, receive, from security agent 210, log data 124 that specifies details of a security event detected by security agent 210.

As used herein, the term "security agent" generally refers to a program, executable, routine, software, and/or other module that performs security functions on a computing device. Similarly, as used herein, the term "log data" generally refers to data obtained over time, as in a log, that documents recorded events and information. Moreover, as used herein, the term "security event" generally refers to any event, trigger, detection, compromise, attack, alert, and/or other occurrence related to security or identified by the security agent at a protected computing system.

Reception module 104 may receive, from the security agent, log data in a variety of ways. In general, reception module 104 may receive the log data via network 204. Reception module 104 may receive the log data in response to transmitting a request for the log data. Alternatively, reception module 104 may receive the log data automatically according to a predefined schedule. Reception module 104 may also receive the log data according to manual transmission or intervention.

At step 304 one or more of the systems described herein may create an instance of a data structure for a logical data model that describes a path cycle of a security threat. The data structure may include fields that specify at least an origin and a target of the security threat. For example, at step 304 creation module 106 may, as part of server 206 in FIG. 2, create instance 212 of data structure 213 for a logical data model that describes a path cycle of a security threat.

As used herein, the term "instance of a data structure" generally refers to a separate portion of memory modeled after a data structure, as a template, such that multiple instances may be created. Moreover, as used herein, the term "data structure" generally refers to a structure that contains at least two fields, as in variables (or embedded data structures), for storing corresponding values. Data structures may also define relationships, such as hierarchical relationships, between variables. Data structures may similarly define functions that may be performed on instances of the data structures and their underlying fields and values, which may be stored publicly or privately. Furthermore, data structures may also specify relationships, such as hierarchical relationships, between themselves and other data structures. Instances of data structures may generally be created through object oriented programming and equivalent computing systems.

Similarly, as used herein, the term "logical data model" generally refers to any model that indicates at least one (binary or granular) directional relationship between different fields of the model, as discussed further below. In some examples, the logical data model may specify that the existence of one entity (such as a computer-based attack) implies, or suggests, the existence of another entity (such as a transmission mechanism for the attack) according to the directional relationship.

Moreover, as used herein, the term "path cycle of the security threat" generally refers to different events and/or entities associated with the behavior or progress of a security threat, as well as the relationships between these events and entities. In general, the logical data model may substantially overlap with, or describe, the path cycle of the security threat, as discussed above.

Furthermore, as used herein, the term "security threat" generally refers to any threat that implicates the security of a computing system. Security threats may involve corresponding payloads, attack vectors, vulnerabilities, targets, indicators of compromise, and/or campaigns, as discussed below.

Additionally, as used herein, the term "origin" of the security threat broadly refers to any origin or source for the security threat, including an author of the security threat, a campaign for the security threat, preexisting malware that provides the source for the security threat, an organization that launched the security threat, etc. Similarly, as used herein, the term "target" of the security threat broadly refers to any user, account, person, computing resource, organization, and/or network, etc., targeted by the security threat.

Creation module 106 may create the instance of the data structure in a variety of ways. In general, creation module 106 may execute a creation or instantiation instruction in an object-oriented programming language or an equivalent computer instruction. The instruction may allocate memory for one or all fields of the data structure, either statically upon creation or dynamically upon demand. Creation module 106 may reference a template or definition of the data structure in creating the instance of the data structure. Creation module 106 may similarly create the instance of the data structure with, or without, populating one or more fields for the data structure, as discussed below for steps 306 and 308. The template or definition of the data structure may generally describe the path cycle or other data for the security event assigned to the instance of the data structure.

Figure 4:
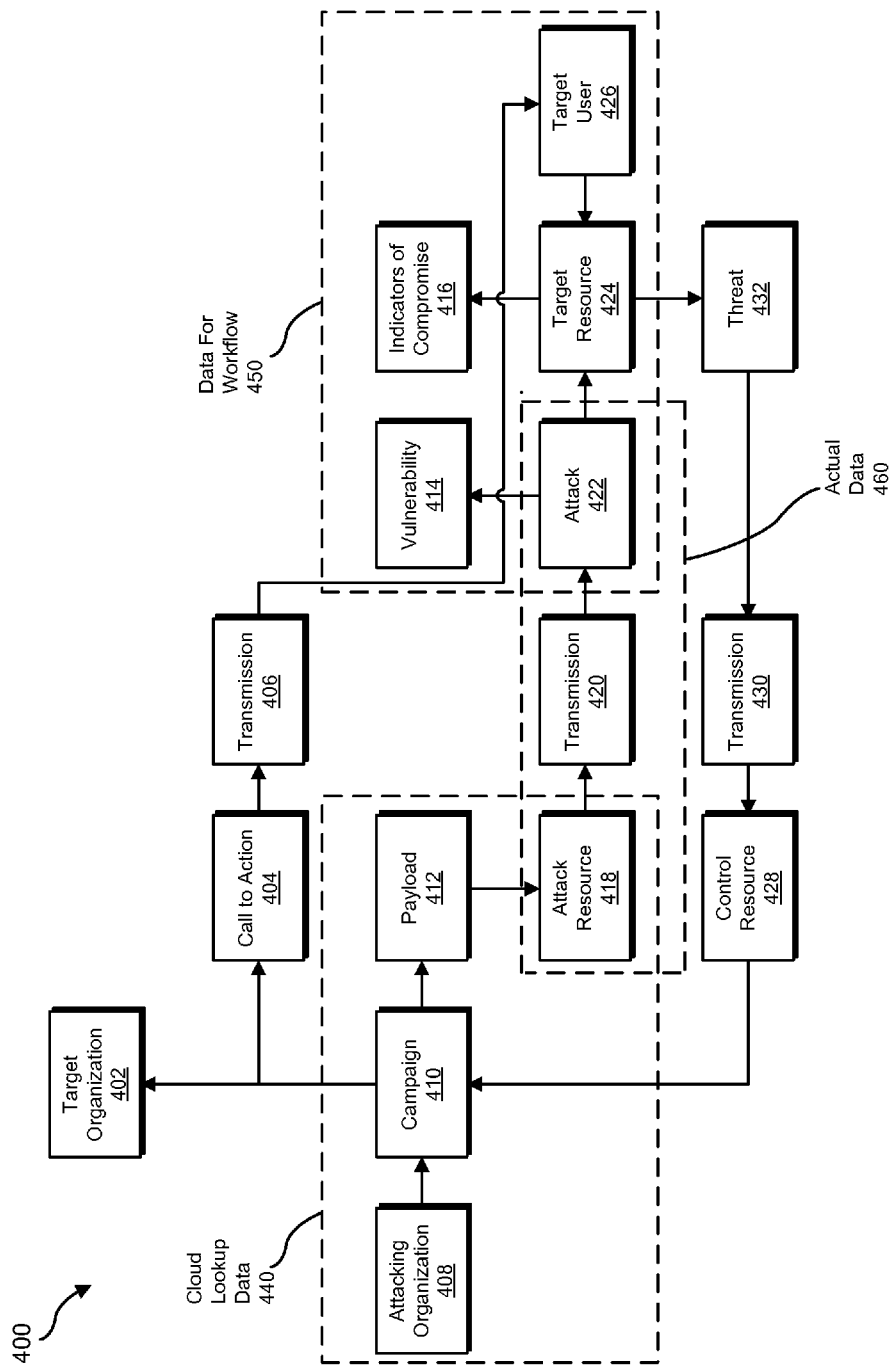
FIG. 4 is a block diagram of an exemplary logical data model for protecting computing resources.

FIG. 4 shows an exemplary logical data model 400 that corresponds to the security event and/or security threat discussed above. As shown in FIG. 4, logical data model 400 may represent a directional graph that shows directional relationships between fields, entities, and/or events associated with a corresponding security event and/or security threat. As further shown in FIG. 4, logical data model 400 may include a target organization 402, a call to action 404 that lures victims to take action that the security threat exploits (e.g., clicking on a specified email UNIFORM RESOURCE LOCATOR), a transmission 406 that specifies the transmission mechanism for call to action 404, an attacking organization 408, a campaign 410, a payload 412, a vulnerability 414, indicators (or symptoms) of compromise 416, an attack resource 418, a transmission 420 that specifies a transmission mechanism for an attack 422, a target resource 424, a target user 426, a control resource 428, and/or a transmission 430 that specifies a transmission mechanism for a threat 432. Similarly, logical data model 400 includes directional arrows that specify relationships between these fields. For example, the arrows may specify that the existence of an entity at one field implies, or suggests, the existence of another entity at another field targeted by the arrow (either directly or indirectly through a chain of arrows). Notably, the arrows may form a closed loop, effectively creating a "path cycle" or "kill chain" associated with the security event and/or security threat. Every arrow may represent a binary logical inference (or hierarchical relationship). Alternatively, any arrow may be weighted such that the arrow indicates a granular relationship (e.g., a point along a scale from zero to 1.0). For example, a relationship may be established if the arrow (or chain of arrows collectively) satisfies a weight threshold.

The fields and arrows of logical data model 400 are merely exemplary. Any similar combination or permutation of the same or different (e.g., similar) fields and arrows may form another logical data model. The fields and arrows may generally define relationships between the fields, as described above.

In one embodiment, creation module 106 may create the instance of the data structure by inferring the existence of security metadata based on underlying security data detected by the security agent. The underlying security data may correspond to the field of the data structure populated based on the details specified by the received log data. In the example of FIG. 4, attack resource 418, transmission 420, and/or attack 422 may be reported directed or indirectly from log data 124, as indicated by actual data 460. Similarly, the security metadata may correspond to the other field populated with the value of incomplete. For example, if log data 124 does not further specify (directly or indirectly) vulnerability 414, indicators of compromise 416, target resource 424, and/or target user 426, then populating module 108 may populate these fields with values of incomplete, as discussed below. In other embodiments, different ones of the fields of logical data model 400 may be automatically completed based on underlying log data 124.

In one embodiment, the underlying security data describes the security event detected by the security agent. In some examples, creation module 106 and/or performance module 110 may infer the existence of security metadata according to a rules database of rules for inferring security metadata from underlying security data. For example, these rules may correspond to the directional arrows (binary and/or weighted, as discussed above) within logical data model 400, as shown in FIG. 4. The rules may be stored in database 120, for example. In one embodiment, the security metadata may correspond to the security threat and may describe at least one of: (1) an attacker that initiates the security threat, such as attacking organization 408 (or corresponding individual), (2) an attack vector that the security threat exploits to propagate itself, such as transmission 406, (3) a threat payload, such as payload 412, and/or (4) a transmission mechanism for transmitting the payload, such as transmission 420.

In some examples, creation module 106 may create the instance of the data structure by categorizing the security event as belonging to a category of use cases from among a set of use cases that describe types of security events. Creation module 106 may also base the creating of the instance of the data structure on the categorization of the security event as belonging to the use case. In one embodiment, the use case may correspond to one of: (1) a malware bot command and control server event, (2) a network intrusion detection system event, and/or (3) a port scan event. In other words, the disclosed systems and methods may operate in three stages. In a first stage, reception module 104 may receive raw log data 124.

In a second stage, creation module 106 may categorize a security event reported by log data 124 into one use case that defines a category of security events. In a third stage, creation module 106 may translate log data 124 for the security event into logical data model 400 based on the categorization of the use case. For example, rules 126 may include rules for translating log data 124 into logical data models. These rules may differ depending on the categorization of the use case, such that different rules translate log data into logical data models differently based on the categorization of the use case. Thus, in some examples, which fields are provided by log data 124 or, instead, unavailable and unknown, as well as the placement and direction of one or more logical arrows, as in FIG. 4, may differ depending on the categorization of use case. In other words, a use case may specify how underlying log data 124 for a specific type of security event (e.g., detecting a command and control server, detecting a signature trigger, detecting activity through a port scan, etc.) may specify specific fields of a logical data model while also implying the existence of other fields, which may be populated as incomplete. Moreover, in creating the instance of the data structure, creation module 106 (and/or another module) may normalize log data 124 by reducing relationships to a minimum number of database tables, for example. Creation module 106 may also maintain integrity across multiple instances of the data structure.

At step 306 one or more of the systems described herein may populate one field of the data structure for the logical data model based on the details specified by the received log data. For example, at step 306 populating module 108 may, as part of server 206 in FIG. 2, populate one field 208 of data structure 213 for the logical data model based on the details specified by received log data 124. As used herein, the phrase "populate" generally refers to setting the value for a corresponding field, as in setting a variable.

Populating module 108 may populate the field of the data structure in a variety of ways. In general, populating module 108 may directly copy the value from a field of log data 124 into the data structure. In other examples, populating module 108 may infer or deduce the corresponding value based on log data 124, without directly copying the corresponding value. For example, populating module 108 may populate attack resource 418, transmission 420, and/or attack 422, as discussed above. Populating module 108 may also ascertain the corresponding value from another database or resource, such as a cloud computing system, using log data 124 as a key or map, as discussed further below.

At step 308 one or more of the systems described herein may populate one other field of the data structure for the logical data model with a value of incomplete based on a completed value for the other field being unavailable. For example, at step 308 populating module 108 may, as part of server 206 in FIG. 2, populate one other field 220 of data structure 213 for the logical data model with a value of incomplete based on a completed value for other field 220 being unavailable.

As used herein, the term "value of incomplete" generally refers to any value of incomplete, partially complete, empty, null, unknown, and/or zero, etc., that specifies that, although the field exists, the field is not currently (and completely) populated with a true or completed value. In more specific examples, the disclosed systems and methods may distinguish between partially incomplete, completely incomplete, unknown, and/or verified nonexistent values. For example, the systems and methods may distinguish between (1) values that specify that data is simply unknown but may exist (e.g., there may be an overarching attack organization, but the identity is unknown) and (2) values that specify that data does not exist (e.g., it is verified that there is no overarching attack organization). Similarly, the term "completed value" generally refers to any value other than a value of incomplete, such that the completed value specifies a true or measured value for the field that provides information that the field is intended to describe. For example, a completed value for a field of "attacker" may include the name of the attacking organization that launched a security threat.

Populating module 108 may populate the other field of the data structure in a variety of ways. In general, populating module 108 may assign a value of empty, incomplete, zero, null, and/or unknown to the corresponding field or variable within the data structure, as discussed above. Values of "empty," for example, may correspond to special instructions and/or values specified by the programming language that creates the data structure.

In some examples, populating module 108 may populate the other field with the value of incomplete based on inferring the existence of the security metadata. In the example of FIG. 4, populating module 108 may infer the existence of vulnerability 414, indicators of compromise 416, and/or target resource 424 based on the existence of attack resource 418 (e.g., an identified malware bot command and control server). In other words, the detection of a command and control server implies the existence of other entities of interest, such as vulnerabilities, symptoms, and targets. Accordingly, the disclosed systems and methods may create fields for these inferred entities and populate those fields with values of incomplete (e.g., until completed values are known). The arrows in FIG. 4 may illustrate these inferences, for example. Thus, populating module 108 may populate the other field of the data structure for the logical data model (e.g., vulnerability 414) with the value of incomplete by determining whether the completed value is available for the other field. Populating module 108 may also populate the other field based on determining that the completed value for the other field is unavailable.

At step 310 one or more of the systems described herein may perform a security action to protect users based on an analysis of the instance of the data structure for the logical data model. For example, at step 310 performance module 110 may, as part of server 206 in FIG. 2, perform a security action to protect users based on an analysis of instance 212 of data structure 213 for the logical data model.

As used herein, the term "security action" broadly refers to any action that is taken to (directly or indirectly) increase protection for users. Examples of security actions may include (1) performing statistical analysis on instances of data structures to learn about security threats, (2) creating further instances of data structures to identify inferred security events from other security events, (3) reporting and/or applying any information learned from statistical analysis, (4) targeting investigation resources based on results of the analysis, and/or (5) other security responses such as shutting down devices, altering or enhancing security settings, performing scans and/or repair operations, and/or notifying users and/or administrators, for example.

Performance module 110 may perform the security action in a variety of ways. In general, performance module 110 may perform the security action to learn more about security threats. In one example, performance module 110 may analyze not just the instance of the data structure but also another instance of the same (or similar) data structure (e.g., in combination). More generally, performance module 110 may perform a statistical analysis over a set or group of instances of data structures. One or more of these instances may have one or more fields that are populated as incomplete, as discussed above. Thus, without further manual intervention, the disclosed systems and methods may automatically prepare comprehensive data sets from mere raw log data 124. These data sets may automatically enable security vendors and security systems to perform statistical analyses over these comprehensive data sets.

The statistics may include: (1) frequencies, prevalence, and/or rankings of attacking organizations, (2) numbers and/or proportions of security events and/or attacks attributed to organizations that are identified (or unidentified), and/or (3) numbers and/or proportions of attack resources that are identified (or unidentified). More generally, performance module 110 may perform statistics, over a data set formed of instances of the data structure, that determine what number and/or proportion of any field of logical data model 400 are known and/or unknown. The instances of the data structure in the data set may include some or all instances satisfying one or more conditions, including time, type, and/or geographic conditions of the security event, and/or all created based on the same or similar security scan. Performance module 110 may also specify any response or remediation option based on results of these statistical analyses, such as those discussed above.

In some examples, performance module 110 may perform the security action to protect users by creating an additional instance of the data structure based on the instance of the data structure for the logical data model. In one embodiment, performance module 110 may populate the security action by inferring the existence of an additional security event based on the security event detected by the security agent.

Figure 5:
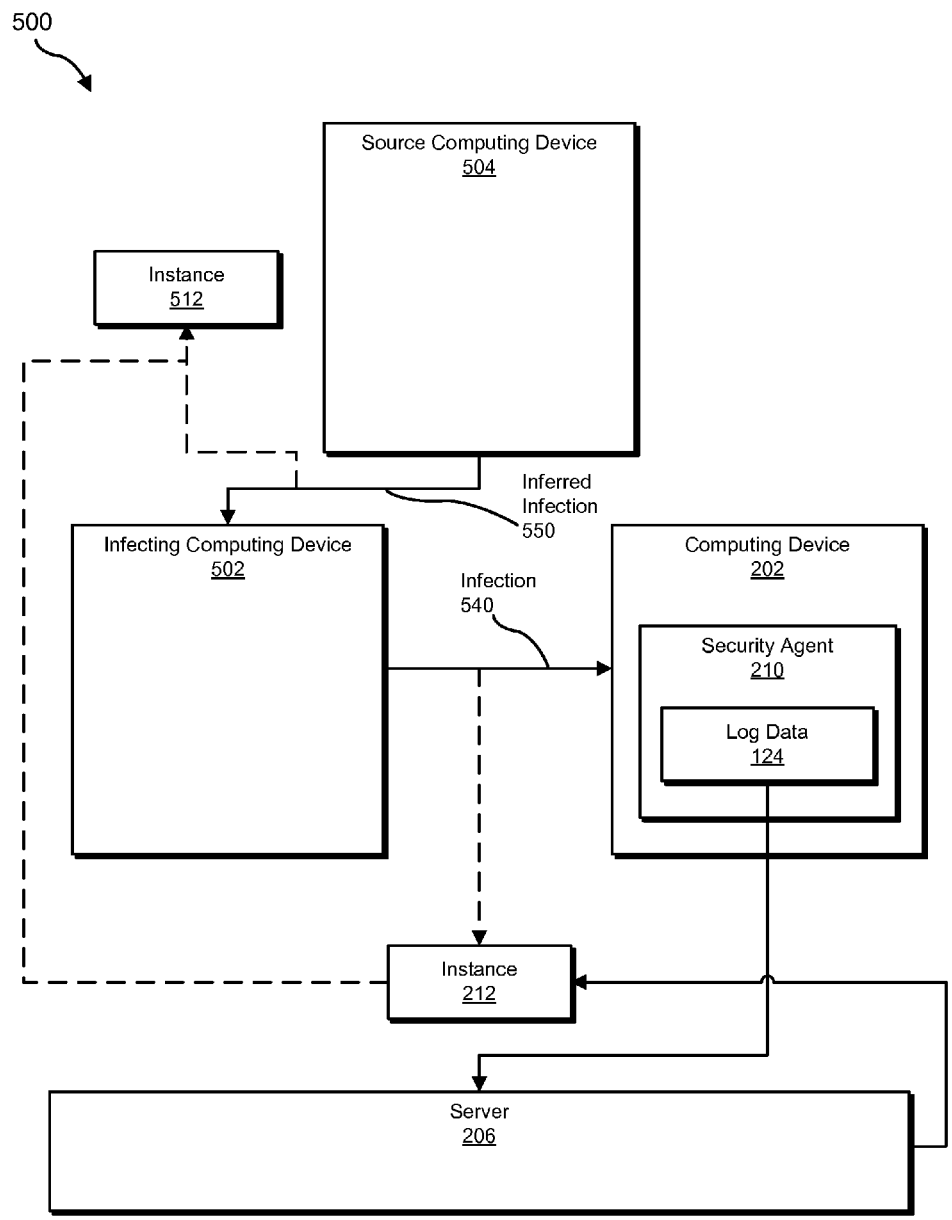
FIG. 5 is a block diagram of an exemplary workflow for protecting computing resources based on logical data models.

FIG. 5 illustrates an exemplary workflow 500 that includes three computing devices in a chain of infections, a source computing device 504, an infecting computing device 502, and computing device 202. Security agent 210 at computing device 202 may first identify an infection 540 by infecting computing device 502, as reported in log data 124. Security agent 210 may report log data 124 to server 206, as shown in FIG. 5. Accordingly, performance module 110 (and/or another of modules 102) may infer the existence a second, earlier, inferred infection 550 from originating source computing device 504. In other words, performance module 110 may tentatively infer that infecting computing device 502 is not the original source of the infection, but instead was also previously infected by source computing device 504. Performance module 110 may similarly repeat these inferences an arbitrary number of times (e.g., according to predetermined settings) to infer the existence of a chain of infections as the security threat propagates.

As further shown in FIG. 5, creation module 106 may create instance 212 to model infection 540, and creation module 106 may similarly create an additional instance 512 to model inferred infection 550. Both instance 212 and instance 512 may correspond to instances of the data structure that describes logical data model 400, as discussed above, and may similarly include any permutation of fields and/or arrows shown in FIG. 4. Thus, as discussed above for FIG. 5, the security event may correspond to the instance of the data structure for the logical data model. Similarly, the additional security event may correspond to the additional instance of the data structure for the logical data model.

In some examples, performance module 110 may perform the security action by ascertaining the completed value for the other field of the data structure for the logical data model. Performance module 110 may also overwrite the value of incomplete for the other field with the completed value. The completed value may describe an accurate, estimated, identified, and/or measured value for the corresponding field. Performance module 110 may ascertain the completed value in any suitable manner, including through a security scan, a security analysis, a statistical analysis, and/or a database or security backend server lookup. For example, performance module 110 may ascertain the completed value for the other field of the data structure for the logical data model by extracting the completed value from a cloud computing system, such as a security database provided through the cloud computing system. These other fields may correspond to any permutation of the fields in cloud lookup data 440 shown in FIG. 4, which populating module 108 may populate directly or indirectly based on corresponding data from the cloud computing system. In some examples, performance module 110 may overwrite the value for the field based on a known value of a parent field (e.g., according to arrows and/or relationships, as shown in FIG. 4), even if intermediate fields remain incomplete. Performance module 110 may similarly correlate, match, and/or relate two fields with known values even if intermediate fields remain incomplete.

In some examples, performance module 110 may perform the security action by determining that the other field is populated with the value of incomplete. Similarly, performance module 110 may target investigation resources to determine the completed value for the other field based on the determination that the other field is populated with the value of incomplete. For example, performance module 110 may target, allocate, and/or modulate investigation resources (e.g., man hours, computing hours, computing power, energy, cost, time, analyses, etc.) based on a number and/or prevalence of the corresponding field appearing and/or appearing as "incomplete," as described above. Thus, performance module 110 may allocate more resources to identify more numerous, frequent, and/or prevalent "incomplete" fields than other incomplete fields, or than other completed fields. In allocating resources, performance module 110 may also factor in the dangerousness, maliciousness, and/or magnitude of the security threat, such that security threats of low frequency may still receive more investigation resources if the security threat is more severe, for example. Performance module 110 may similarly adjust and/or set a security setting or policy based on converting an incomplete value for a data field to a completed value (e.g., upon identifying the completed value), and/or based on performing a new statistical analysis using the more completed instance of the data structure instead of the previous incomplete instance. For example, some security actions, responses, settings, and/or policies may be previously associated with identified attacks, attackers, campaigns, vulnerabilities, etc., such that any of these security actions may be performed, adjusted, and/or increased in response to the act of identifying. Performance module 110 may additionally select the security action based on the categorization of use case, as described above.

As explained above in connection with method 300 in FIG. 3, the disclosed systems and methods may normalize log data received from security agents. The disclosed systems and methods may also automatically prepare data structures for logical data models, even when values for some fields of the data structures are currently unavailable. Accordingly, the disclosed systems and methods may enable security vendors to automatically prepare and analyze these data structures to thereby establish a more accurate and comprehensive view of security threats and appropriate responses.

Figure 6:
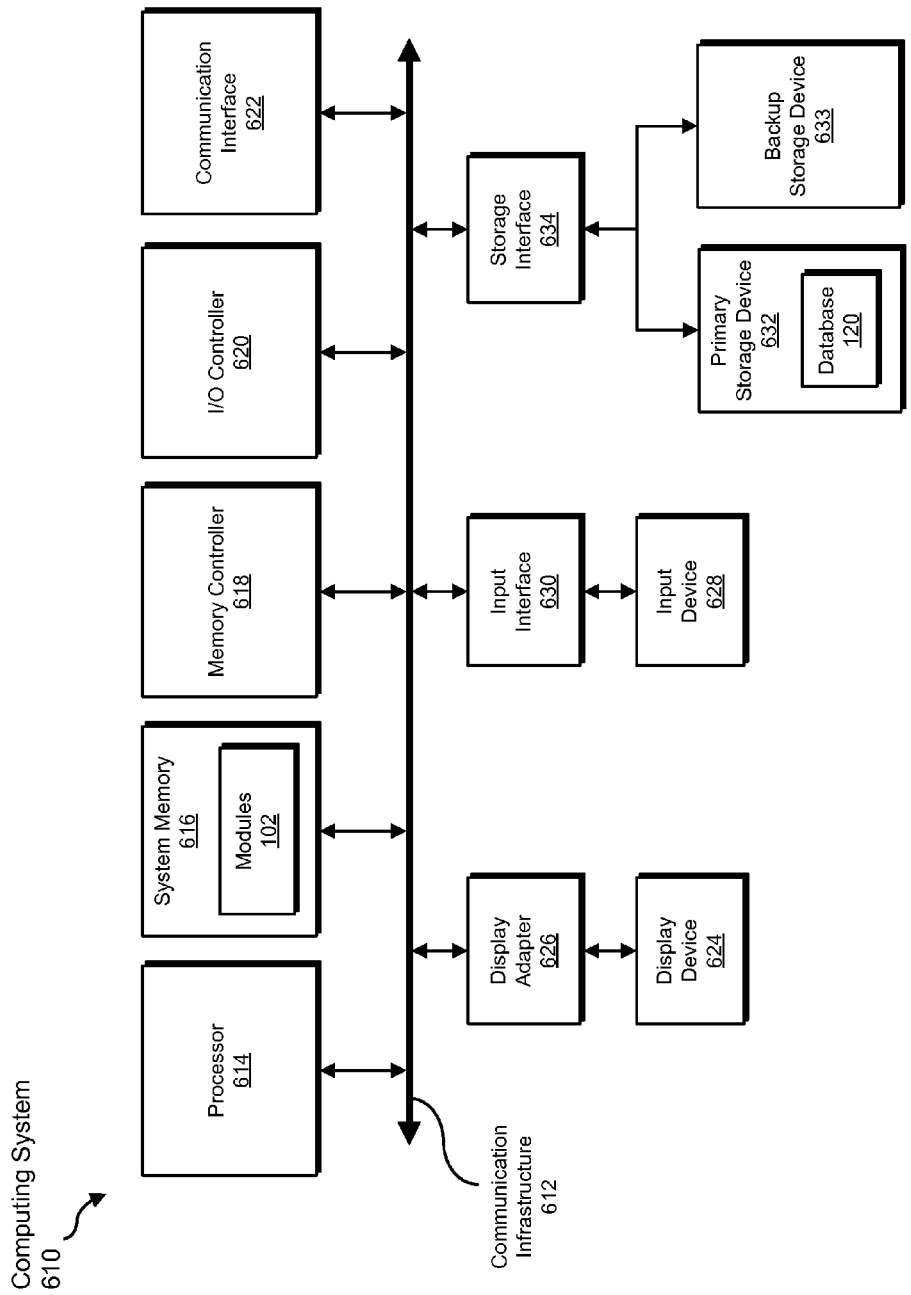
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
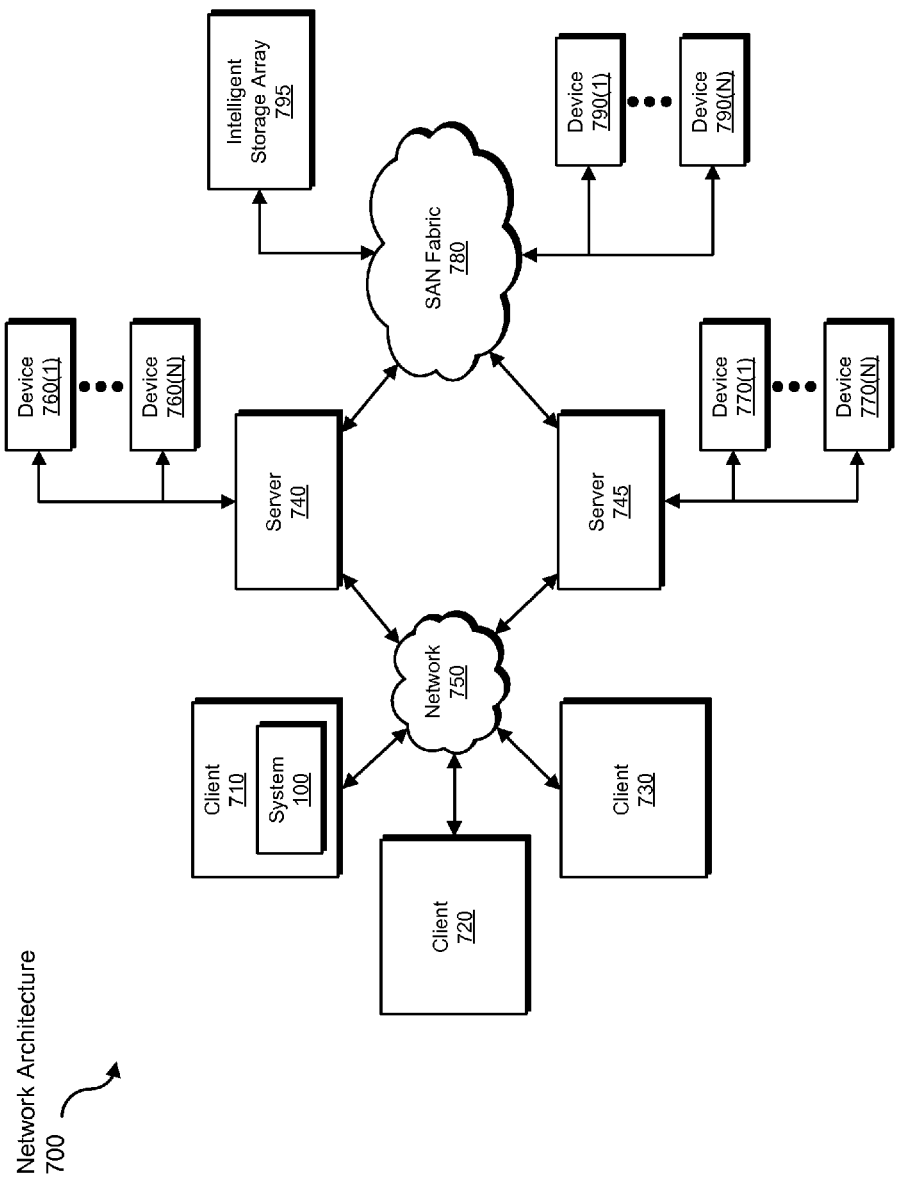
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for protecting computing resources based on logical data models.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive log data, telemetry data, logical data models, and/or security profiles/settings to be transformed, transform any one or more of these as discussed above (e.g., by mapping log data to logical data models (e.g., via use case categorization), by populating fields as null, and/or by altering security settings), output a result of the transformation to an output device or endpoint computing system, use the result of the transformation to protect computing resources and users, and store the result of the transformation to memory or disk. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting computing resources based on logical data models, at least a portion of the method being performed by a computing device comprising at least one processor, the method comprising:
   receiving, from a security agent, log data that specifies details of a security event detected by the security agent;
   creating an instance of a data structure for a logical data model that describes a path cycle of a security threat, the data structure including fields that specify at least an origin and a target of the security threat;
   populating at least one field of the data structure for the logical data model based on the details specified by the received log data;
   populating at least one other field of the data structure for the logical data model with a value of incomplete based on a completed value for the other field being unavailable;
   performing an analysis of a group of instances of the data structure for the logical data model, the group including the instance of the data structure for the logical data model, by determining a proportion of the group of instances that have a value of incomplete at the other field;
   performing a security action to protect users by targeting investigation resources based on the analysis of the group of instances of the data structure for the logical data model that determined the proportion of the group of instances that have the value of incomplete at the other field.

2. The computer-implemented method of claim 1, wherein:
   creating the instance of the data structure comprises inferring the existence of security metadata based on underlying security data detected by the security agent;
   the underlying security data corresponds to the field of the data structure populated based on the details specified by the received log data;
   the security metadata corresponds to the other field populated with the value of incomplete.

3. The computer-implemented method of claim 2, wherein populating the other field with the value of incomplete is performed based on inferring the existence of the security metadata.

4. The computer-implemented method of claim 2, wherein the underlying security data describes the security event detected by the security agent.

5. The computer-implemented method of claim 2, wherein inferring the existence of security metadata is performed according to a rules database of rules for inferring security metadata from underlying security data.

6. The computer-implemented method of claim 2, wherein the security metadata corresponds to the security threat and describes at least one of:
   an attacker that initiates the security threat;
   an attack vector that the security threat exploits to propagate itself;
   a threat payload;
   a transmission mechanism for transmitting the payload.

7. The computer-implemented method of claim 1, wherein
   creating the instance of the data structure comprises:
   categorizing the security event as belonging to a category of use cases from among a set of use cases that describe types of security events;
   basing the creating of the instance of the data structure on the categorization of the security event as belonging to the category of use cases.

8. The computer-implemented method of claim 7, wherein the category of use cases corresponds to one of:
   a malware bot command and control server event;
   a network intrusion detection system event;
   a port scan event.

9. The computer-implemented method of claim 1, wherein performing the security action to protect users comprises creating an additional instance of the data structure based on the instance of the data structure for the logical data model.

10. The computer-implemented method of claim 9, wherein:
    performing the security action comprises inferring the existence of an additional security event based on the security event detected by the security agent;
    the security event corresponds to the instance of the data structure for the logical data model;
    the additional security event corresponds to the additional instance of the data structure for the logical data model.

11. The computer-implemented method of claim 1, wherein populating the other field of the data structure for the logical data model with the value of incomplete comprises:
    determining whether the completed value is available for the other field;
    populating the other field of the data structure with the value of incomplete based on determining that the completed value for the other field is unavailable.

12. The computer-implemented method of claim 1, further comprising performing an additional security action that comprises:
    ascertaining the completed value for the other field of the data structure for the logical data model;
    overwriting the value of incomplete for the other field with the completed value.

13. The computer-implemented method of claim 12, wherein ascertaining the completed value for the other field of the data structure for the logical data model comprises extracting the completed value from a cloud computing system.

14. The computer-implemented method of claim 1, wherein performing the security action comprises:
    determining that the other field is populated with the value of incomplete;
    targeting investigation resources to determine the completed value for the other field based on the determination that the other field is populated with the value of incomplete.

15. A system for protecting computing resources based on logical data models, the system comprising:
    a reception module, stored in memory, that receives, from a security agent, log data that specifies details of a security event detected by the security agent;
    a creation module, stored in memory, that creates an instance of a data structure for a logical data model that describes a path cycle of a security threat, the data structure including fields that specify at least an origin and a target of the security threat;
    a populating module, stored in memory, that:
       populates at least one field of the data structure for the logical data model based on the details specified by the received log data;
       populates at least one other field of the data structure for the logical data model with a value of incomplete based on a completed value for the other field being unavailable;
    a performance module, stored in memory, that:
       performs an analysis of a group of instances of the data structure for the logical data model, the group including the instance of the data structure for the logical data model, by determining a proportion of the group of instances that have a value of incomplete at the other field;
       performs a security action to protect users by targeting investigation resources based on the analysis of the group of instances of the data structure for the logical data model that determined the proportion of the group of instances that have the value of incomplete at the other field;
    at least one physical processor configured to execute the reception module, the creation module, the populating module, and the performance module.

16. The system of claim 15, wherein:
    the creation module creates the instance of the data structure at least in part by inferring the existence of security metadata based on underlying security data detected by the security agent;
    the underlying security data corresponds to the field of the data structure populated based on the details specified by the received log data;
    the security metadata corresponds to the other field populated with the value of incomplete.

17. The system of claim 16, wherein the populating module populates the other field with the value of incomplete based on inferring the existence of the security metadata.

18. The system of claim 16, wherein the underlying security data describes the security event detected by the security agent.

19. The system of claim 16, wherein the creation module infers the existence of the security metadata according to a rules database of rules for inferring security metadata from underlying security data.

20. A non-transitory computer-readable medium comprising one or more computer-readable instructions that, when executed by at least one processor of a computing device, cause the computing device to:
    receive, from a security agent, log data that specifies details of a security event detected by the security agent;

create an instance of a data structure for a logical data model that describes a path cycle of a security threat, the data structure including fields that specify at least an origin and a target of the security threat;

populate at least one field of the data structure for the logical data model based on the details specified by the received log data;

populate at least one other field of the data structure for the logical data model with a value of incomplete based on a completed value for the other field being unavailable;

performing an analysis of a group of instances of the data structure for the logical data model, the group including the instance of the data structure for the logical data model, by determining a proportion of the group of instances that have a value of incomplete at the other field;

perform a security action to protect users by targeting investigation resources based on the analysis of the group of instances of the data structure for the logical data model that determined the proportion of the group of instances that have the value of incomplete at the other field.

* * * * *